United States Patent
Li

(10) Patent No.: US 11,738,260 B2
(45) Date of Patent: Aug. 29, 2023

(54) GAME CONTROLLER WITH DPAD

(71) Applicant: SHENZHEN ONEBITDO TECH CO., LTD., Guangdong (CN)

(72) Inventor: Chuankun Li, Shenzhen (CN)

(73) Assignee: SHENZHEN ONEBITDO TECH CO., LTD., Shenzhen (CN)

( * ) Notice: Subject to any disclaimer, the term of this patent is extended or adjusted under 35 U.S.C. 154(b) by 0 days.

(21) Appl. No.: 16/965,021

(22) PCT Filed: Sep. 18, 2019

(86) PCT No.: PCT/CN2019/106470
§ 371 (c)(1),
(2) Date: Jul. 27, 2020

(87) PCT Pub. No.: WO2021/046878
PCT Pub. Date: Mar. 18, 2021

(65) Prior Publication Data
US 2022/0347561 A1    Nov. 3, 2022

(30) Foreign Application Priority Data

Sep. 9, 2019 (CN) .......................... 201921493738.0

(51) Int. Cl.
*A63F 13/24* (2014.01)
(52) U.S. Cl.
CPC ...... *A63F 13/24* (2014.09); *A63F 2300/1043* (2013.01)
(58) Field of Classification Search
None
See application file for complete search history.

(56) References Cited

U.S. PATENT DOCUMENTS

| 6,184,868 B1 * | 2/2001 | Shahoian | A63F 13/428 345/161 |
| 2002/0103025 A1 * | 8/2002 | Murzanski | A63F 13/24 463/37 |

(Continued)

FOREIGN PATENT DOCUMENTS

AU    2019100491 A4 *    6/2019    ............. A63F 13/24

OTHER PUBLICATIONS

Hyperkin, Fix-it Fridays: How to Replace the Silicone Pads in an NES Controller, Oct. 7, 2016, https://www.youtube.com/watch?v=SlwQUXW-YXA , p. 1 (Year: 2016).*

*Primary Examiner* — Tramar Harper

(57) ABSTRACT

A cross button and a game controller with Dpad are provided. The cross button includes a button cap, a silicone pad, a circuit board and a controller. The circuit board is communicatively connected to the controller, and the silicone pad is located between the button cap and the circuit board. A first anti-mistouch pillar and four first trigger pillars are disposed on the silicone pad, and they are located on a side on the silicone pad close to the circuit board. The four first trigger pillars are evenly distributed on the silicone pad, and the first anti-mistouch pillar is located at a center of the four first trigger pillars. When all of the four first trigger pillars trigger signals, the controller controls a virtual button to trigger. A virtual button function of cross button is added without changing the original button, so the applicability of the cross button is enhanced.

14 Claims, 3 Drawing Sheets

(56) References Cited

U.S. PATENT DOCUMENTS

| | | | |
|---|---|---|---|
| 2003/0030619 A1* | 2/2003 | Martin | A63F 13/218 |
| | | | 345/156 |
| 2009/0050464 A1* | 2/2009 | Otani | H01H 1/06 |
| | | | 200/6 A |
| 2010/0258425 A1* | 10/2010 | Takahashi | H01H 1/10 |
| | | | 200/341 |
| 2011/0183759 A1* | 7/2011 | Lin | A63F 13/22 |
| | | | 463/38 |
| 2012/0050232 A1* | 3/2012 | Ikeda | A63F 13/24 |
| | | | 345/184 |
| 2013/0249830 A1* | 9/2013 | Quek | G06F 3/0393 |
| | | | 345/173 |
| 2015/0031452 A1* | 1/2015 | Rundell | A63F 13/23 |
| | | | 463/31 |
| 2016/0317921 A1* | 11/2016 | Schmitz | A63F 13/23 |
| 2017/0354871 A1* | 12/2017 | Okamura | A63F 13/24 |
| 2018/0353850 A1* | 12/2018 | Strahle | A63F 13/98 |
| 2019/0060746 A1* | 2/2019 | Ironmonger | A63F 13/24 |
| 2021/0197080 A1* | 7/2021 | Su | A63F 13/24 |

\* cited by examiner

GAME CONTROLLER WITH DPAD

BACKGROUND OF THE INVENTION

Field of the Invention

The invention relates to the technical field of electronic equipment, and particularly relates to a game controller with Dpad.

Description of Related Art

The cross button is a kind of input device, especially the commonly used buttons of a game controller with Dpad, which correspond to multiple buttons, and each button triggers a button signal. The existing cross buttons have a limited number of buttons and a single function, which can no longer meet the user's use requirements.

SUMMARY OF THE INVENTION

The problem solved by the invention is that the existing cross buttons have a limited number of buttons and a single function.

A cross button is provided in the invention. The cross button includes a button cap, a silicone pad, a circuit board and a controller. The circuit board is communicatively connected to the controller, and the silicone pad is located between the button cap and the circuit board. A first anti-mistouch pillar and four first trigger pillars are disposed on the silicone pad, and they are located on a side on the silicone pad close to the circuit board. The four first trigger pillars are evenly distributed on the silicone pad, and the first anti-mistouch pillar is located at a center of the four first trigger pillars. When all of the four first trigger pillars trigger signals, the controller controls a virtual button to trigger.

In one embodiment, the first anti-mistouch pillar has a stepped structure.

In one embodiment, a height of the first anti-mistouch pillar is greater than or equal to a height of the first trigger pillar.

In one embodiment, the first anti-mistouch pillar includes a first pillar section and a second pillar section that are connected to each other, the second pillar section is connected to the silicone pad, the first pillar section is located at a side of the second pillar section close to the circuit board, and a cross-sectional area of the first pillar section is smaller than a cross-sectional area of the second pillar section; and a height of the second pillar section is smaller than a height of the first trigger pillar.

In one embodiment, a second anti-mistouch pillar is disposed on the button cap, and the second anti-mistouch pillar is located on a side of the button cap close to the silicone pad and corresponds to a position of the first anti-mistouch pillar.

In one embodiment, the button cap is further provided with four second trigger pillars, the four second trigger pillars are located on a side of the button cap close to the silicone pad, and positions of the four second trigger pillars respectively correspond to positions of the four first trigger pillars.

In one embodiment, a height of the second trigger pillar is equal to a height of the second anti-mistouch pillar.

In one embodiment, a second limit groove matching with the second trigger pillar is further disposed on the silicone pad, the second limit groove is located at a side of the silicone pad close to the button cap, and the second limit groove is plugged and mated with the second trigger pillar.

In one embodiment, the silicone pad is further provided with a first limit groove matching with the second anti-mistouch pillar, the first limit groove is located at a side of the silicone pad close to the button cap, and the first limit groove is plugged and mated with the second anti-mistouch pillar. For the cross button in the invention, the mounting stability of the button cap is achieved by disposing the first anti-mistouch pillar and four first trigger pillars on the silicone pad; and through the provision of the first anti-mistouch pillar and disposing the first anti-mistouch pillar at a center of the four first trigger pillars, the false triggering of the cross button is avoided when a single one of the first trigger pillars is pressed and one virtual button is triggered when all the four first trigger pillars trigger the button signals.

For the cross button in the invention, by providing the first anti-mistouch pillar with a stepped structure, the contradiction between the virtual button and the prevention of accidental touch caused by the full trigger of the four first trigger pillars of the cross button are solved with the segmented design of the stepped structure, so that the reliability is improved and the practicality is enhanced.

For the cross button in the invention, a virtual button function is added without changing the original button of the cross button, so that applicability of the cross button is enhanced, and violent destruction caused by the vigorous pressing of the cross button is avoided to a certain extent, thereby facilitating the reliability and the practicality.

In another aspect, a game controller with Dpad is further provided in the invention, the game controller with Dpad including the above cross button.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

To enable the above objects, features and advantages of the invention to be more apparent and easily understood, the specific embodiments of the invention will be further elaborated hereafter in connection with the drawings.

With the continuous development of the game, the demand for multi-function of the handle is getting higher and higher, and the cross button is limited by the operation space and the number of buttons is limited, which may no longer meet the needs of users and affect the user experience. The inventor of the invention obtained the invention on long-term research.

Figure 1:
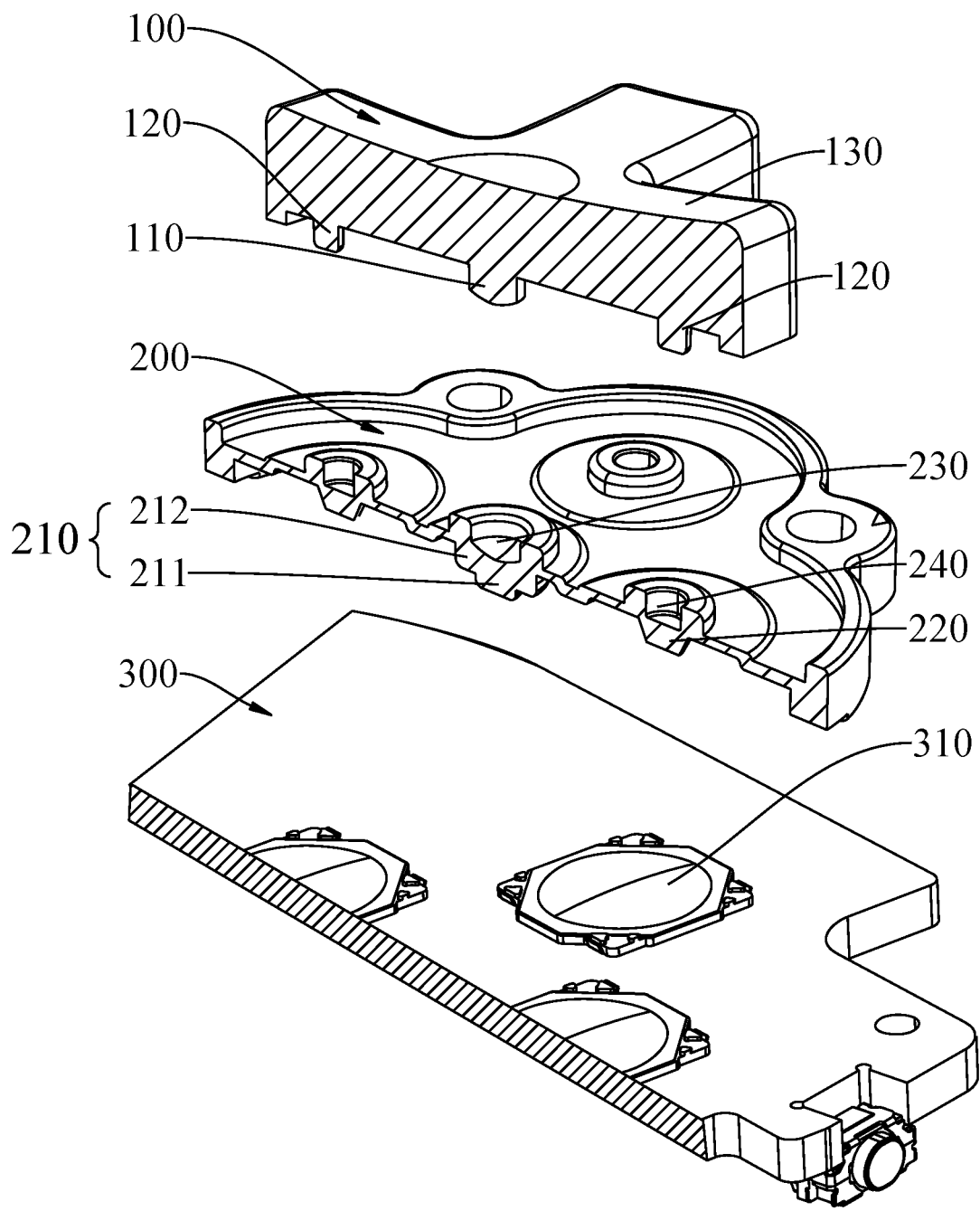
FIG. 1 is a structural diagram of one embodiment for the cross button of the invention.

With reference to FIG. 1, the invention provides a cross button, which includes a button cap 100, a silicone pad 200, a circuit board 300 and a controller, wherein the circuit board 300 is communicatively connected to the controller, and the silicone 200 pad is located between the button cap 100 and the circuit board 300.

A first anti-mistouch pillar 210 and four first trigger pillars 220 are disposed on the silicone pad 200, and both the first anti-mistouch pillar 210 and the first trigger pillars 220 are located on a side on the silicone pad 200 close to the circuit board 300. The four first trigger pillars 220 are evenly distributed on the silicone pad 200, and the first anti-mistouch pillar 210 is located at a center of the four first trigger pillars 220.

When all of four first trigger pillars 220 trigger signals, the controller controls a virtual button to trigger.

It should be noted that in the present embodiment, the button cap 100, the silicone pad 200 and the circuit board 300 are arranged in order from top to bottom. The four first trigger pillars 220 are arranged in a cross shape, and the four first trigger pillars 220 are evenly distributed on the silicone pad 200. Generally, distances between the first trigger pillars 220 and intersections of the cross are equal, and the first anti-mistouch pillar 210 is located at the center of the four first trigger pillars 220, that is to say, the first anti-mistouch pillar 210 is located at the intersection of the cross.

It should be noted that when the first trigger pillar 220 is pressed alone, the circuit board 300 is triggered to generate a corresponding button signal. Specifically, in some embodiments, four metal dome buttons 310 are disposed on the circuit board 300, the metal dome buttons 310 are corresponding to the first trigger pillars 220, and the depression of the first trigger pillars 220 drives the metal dome buttons 310 to trigger the circuit board 300 to generate a corresponding button signal.

Figure 2:
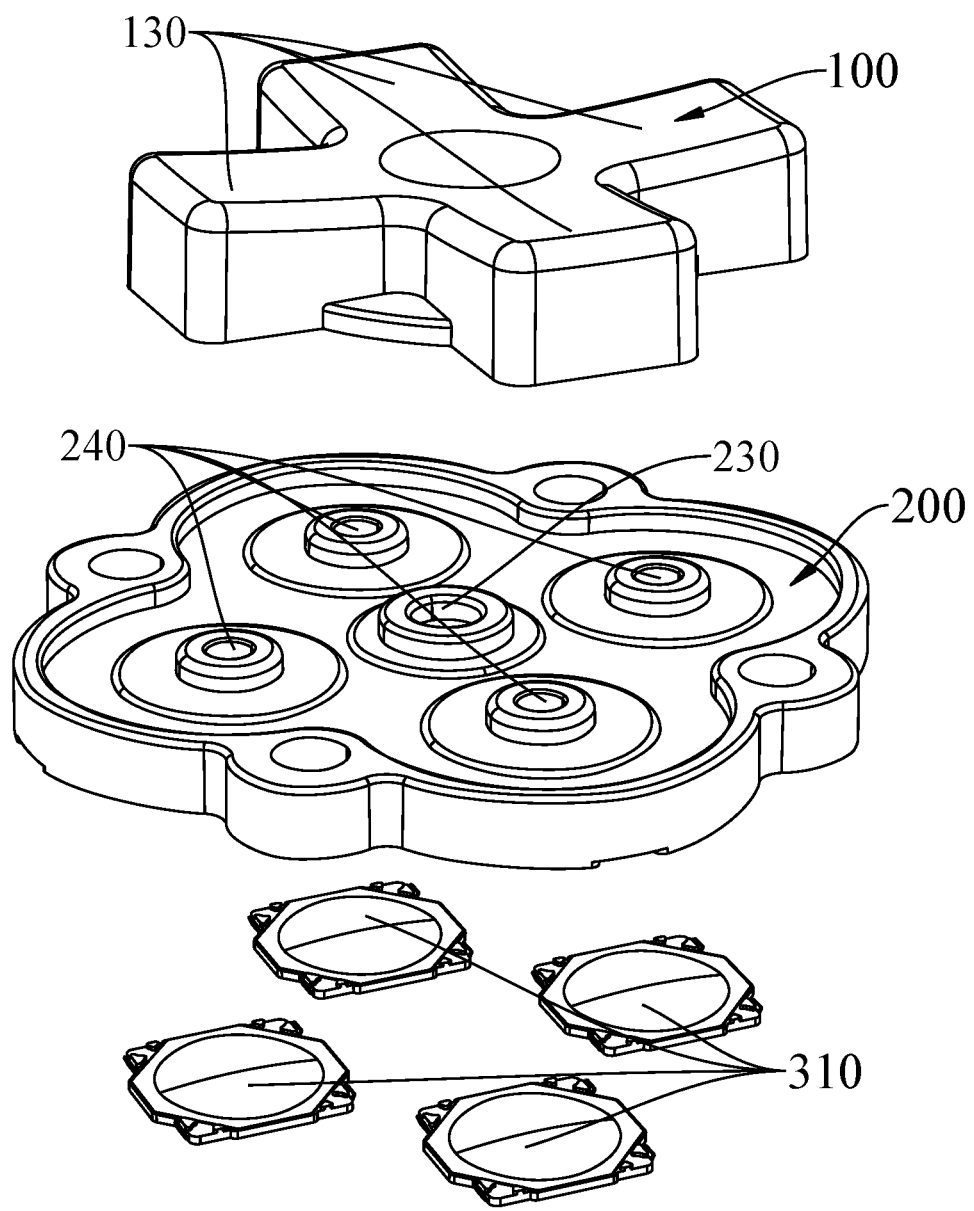
FIG. 2 is a structural diagram of one embodiment for the cross button of the invention.
Figure 3:
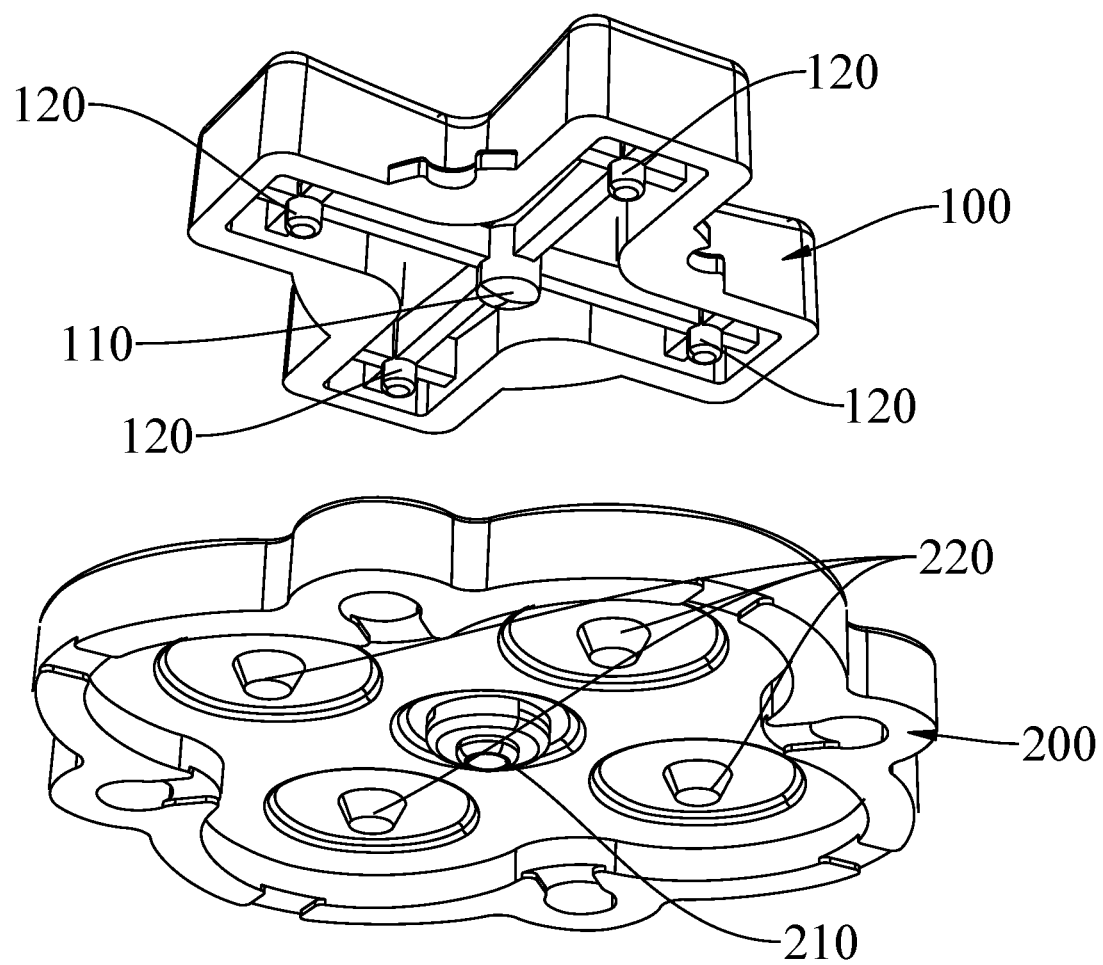
FIG. 3 is a structural diagram of the button cap and the silicone pad of the cross button of the invention.

As shown in FIGS. 1 to 3, four pressing portions 130 are disposed on an upper surface of the button cap 100, and the pressing portions 130 are disposed in a one-to-one correspondence with the first trigger pillars 220. Taking one of the pressing portions 130 as an example: when the pressing portion 130 on the right is pressed, the first trigger pillar 220 located under the pressing portion 130 is compressed by force to drive the metal dome button 310 to press down and trigger the circuit board 300 to generate a corresponding button signal. Then, the pressing portion 130 on the right side of the button cap 100 is pressed and tilted downward, and the compression amount of the first anti-mistouch pillar 210 is smaller than that of the first trigger pillar 220 under the action of the elastic force of the first anti-mistouch pillar 210, and the first trigger pillar 220 on the left has less or no compression, so as to ensure that all the button signals are not triggered at the same time, avoiding the occurrence of false triggers, and having the effect of preventing accidental touch. When the pressing force received by the pressing portion 130 on the right side of the button cap 100 increases, the first anti-mistouch pillar 210 continues to compress, so that the other first trigger pillars 220 continues to compress to drive the metal dome button 310 below to press down to trigger the circuit board 300 to generate a corresponding button signal. Then, the four first trigger pillars 220 all trigger corresponding button signals, and the controller receives the four button signals triggered by the first trigger pillars 220 and controls the virtual button to trigger, that is, producing a fifth button, so that the function of the cross button is greatly improved. Preferably, when the center of the button cap 100 is pressed, the first anti-mistouch pillar 210 is compressed to a certain degree, so that the four first trigger pillars 220 all compress and trigger the button signal generated by the circuit board 300, and the controller controls the virtual button to trigger. The virtual button may be used to trigger some new functions different from that triggered by a single button, such as the ultimate move and the combos in the game. It should be understood that the compression amount represents a difference in height between the first anti-mistouch pillar 210 or the first trigger pillar 220 when the button cap 100 is not pressed and when it is pressed.

In some embodiments, the height of the first anti-mistouch pillar 210 is greater than the height when the first trigger pillar 220 is compressed and a button signal is triggered. In other words, when not assembled, the first anti-mistouch pillar 210 is flush with an upper end of the first trigger pillar 220, and a lower end of the first anti-mistouch pillar 210 exceeds a lower end of the first trigger pillar 220. Thus, in assembled state, when the button cap 100 is not pressed, the first anti-mistouch pillar 210 has a certain amount of compression and has a pre-pressure, and the button cap 100 has high stability under the action of the pre-pressure. It should be understood that in some other embodiments, the heights of the first anti-mistouch pillar 210 and the first trigger pillar 220 may also be equal. In this way, the silicone pad 200 is placed on the circuit board 300 smoothly and stably. In the assembled state, the first anti-mistouch pillar 210 and the first trigger pillar 220 may have the same pre-pressure and high stability when the button cap 100 is not pressed.

As shown in FIGS. 1 and 3, the first anti-mistouch pillar 210 has a stepped structure.

In some embodiments, the first anti-mistouch pillar 210 includes a first pillar section 211 and a second pillar section 212 that are connected to each other, the second pillar section 212 is connected to the silicone pad 200, the first pillar section 211 is located at a side of the second pillar section 212 close to the circuit board 300, and a cross-sectional area of the first pillar section 211 is smaller than a cross-sectional area of the second pillar section 212; a height of the second pillar section 212 is smaller than a height of the first trigger pillar 220.

Specifically, in other words, the first pillar section 211 is a small end, and the second pillar section 212 is a large end. When the button cap 100 is pressed, the first trigger pillar 220 starts to compress, and the first anti-mistouch pillar 210 also starts to compress. At this time, since the cross-sectional area of the first pillar section 211 is smaller than the cross-sectional area of the second pillar section 212, the compression of the first pillar section 211 provides the main compression amount of the first anti-mistouch pillar 210, and the compression amount is small. Under this condition, a single first trigger pillar 220 may trigger a button signal. As the pressing force received by the button cap 100 increases, the first pillar section 211 and the second pillar section 212 together provide the compression amount of the first anti-mistouch pillar 210. Under this condition, the four first trigger pillars 220 may all trigger the button signal, and the controller controls the virtual signal to trigger.

It should be understood that when only one of the first anti-mistouch pillars 210 triggers the button signal, only the first pillar section 211 is in a compressed state. When all four first anti-mistouch pillars 210 trigger the button signal, the second pillar section 212 and the first pillar section 211 are in a compressed state, and the controller controls the virtual button to trigger. It should be noted that in actual use, due to the characteristics of silicone, as long as the first anti-mistouch pillar 210 starts to be stressed, the first pillar section 211 and the second pillar section 212 start to compress; however, since the compression amount of the second pillar section 212 is negligible relative to the compression amount of the first pillar section 211, it is considered that in this case the second pillar section 212 is not in a compressed state.

In some embodiments, the cross-sectional area of the second pillar section 212 is greater than or equal to the cross-sectional area of the first trigger post 220. When the button cap 100 is pressed, the stepped structure has a better anti-false touch effect and generates better user experience.

Thus, the prevention of accidental touch caused by the full trigger of the four first trigger pillars 220 of the Dpad cross button is realized better with the segmented design of the stepped structure of the first pillar section 211 and the second pillar section 212, so that the reliability is improved and the practicality is enhanced.

As shown in FIGS. 1 to 3, a second anti-mistouch pillar 110 is disposed on the button cap 100, and the second anti-mistouch pillar 110 is located on a side of the button cap 100 close to the silicone pad 200 and corresponds to a position of the first anti-mistouch pillar 210. Specifically, a lower end of the second anti-mistouch pillar 110 is in contact with the upper surface of the silicone pad 200. In some embodiments, the second anti-mistouch pillar 110 and the first anti-mistouch pillar 210 are coaxially arranged; in this way, the pressing force is transmitted through the second anti-mistouch pillar 110, and the force transmission of the first anti-mistouch pillar 210 on the button cap 100 and the silicone pad 200 is stable and reliable.

As shown in FIGS. 1 and 2, the silicone pad 200 is further provided with a first limit groove 230 matching with the second anti-mistouch pillar 110, the first limit groove 230 is located at a side of the silicone pad 200 close to the button cap 100, and the first limit groove 230 is plugged and mated with the second anti-mistouch pillar 110. Specifically, the first limit groove 230 is located below the second anti-mistouch pillar 110, and the first limit groove 230 partially or entirely wraps the second anti-mistouch pillar 110. In some embodiments, a ring structure protrudes upward from the upper surface of the silicone pad 200 to obtain the first limit groove 230. In some other embodiments, the upper surface of the silicone pad 200 is recessed downward to obtain the first limit groove 230. Therefore, under the action of the first limit groove 230, the second anti-mistouch pillar 110 is located reliably, may transmit the pressing force well, and has high reliability and strong practicability.

As shown in FIGS. 1 and 2, four second trigger pillars 120 are disposed on the button cap 100, the four second trigger pillars 120 are located on a side of the button cap 100 close to the silicone pad 200, and positions of the four second trigger pillars 120 correspond to positions of the four first trigger pillars 220. It should be noted that the second trigger pillar 120 is used to transmit the pressing force of the pressing portion 130, and a lower end of the second trigger pillar 120 is in contact with the upper surface of the silicone pad 200. In some embodiments, the second anti-mistouch pillar 120 and the first trigger pillar 220 are coaxially arranged; in this way, through the second trigger pillar 120, the pressing force of the pressing portion 130 is reliably transmitted, and the button cap 100 has high stability.

As shown in FIGS. 1 and 3, a height of the second trigger pillar 120 is equal to a height of the second anti-mistouch pillar 110. In other words, the second trigger pillar 120 is flush with the upper end of the second anti-mistouch pillar 110, and the second trigger pillar 120 is flush with the lower end of the second anti-mistouch pillar 110, so that the button cap 100 has a stable structure and a high reliability. The height of the second trigger pillar 120 is equal to the height of the second anti-mistouch pillar 110, and the force between the button cap 100 and the silicone pad 200 is stable. Since the height of the first anti-mistouch pillar 210 is greater than or equal to the height of the first trigger pillar 220, the stress stability between the silicone pad 200 and the circuit board 300 is high in the assembled state, so that the pressure transmission between the second trigger pillar 120 and the first trigger pillar 220 is stable when the button cap 100 is pressed, and the trigger structure of the cross button is reliable and stable.

As shown in FIGS. 1 and 2, the silicone pad 200 is further provided with a second limit groove 240 matching with the second trigger pillar 120, the second limit groove 240 is located at a side of the silicone pad 200 close to the button cap 100, and the second limit groove 240 is plugged and mated with the second trigger pillar 120. Specifically, the second limit groove 240 is located below the second trigger pillar 120, and the second limit groove 240 partially or entirely wraps the second trigger pillar 120; in some embodiments, a ring structure protrudes upward from the upper surface of the silicone pad 200 to obtain the second limit groove 240. In some other embodiments, the upper surface of the silicone pad 200 is recessed downward to obtain the second limit groove 240. Therefore, under the action of the second limit groove 240, the second trigger pillar 120 is located reliably, may transmit the pressing force well, and has high reliability and strong practicability.

For the cross button in the invention, the mounting stability of the button cap 100 is achieved by providing the first anti-mistouch pillar 210 and four first trigger pillars 220 on the silicone pad 200; and through the provision of the first anti-mistouch pillar 210 and disposing the first anti-mistouch pillar 210 at a center of the four first trigger pillars 220, the false triggering of the cross button is avoided when a single one of the first trigger pillars 220 is pressed and one virtual button is triggered when all the four first trigger pillars trigger the button signals 220. The virtual button function is added without changing the original button of the cross button, so that the applicability of the cross button is enhanced, and the violent destruction caused by the vigorous pressing of the cross button is avoided to a certain extent, thereby facilitating the reliability and the practicality.

Another embodiment of the invention provides a game controller with Dpad, the game controller with Dpad including the above cross button. Thus, the game controller with Dpad has more functions, smoother operation, longer service life, high reliability and strong practicability.

In the description of the present specification, the description with reference to the terms "an embodiment", "some embodiments", "example", "specific example", or "some examples" and the like means that specific features, structures, materials, or features described in connection with the embodiments or examples are included in at least one embodiment or example of the invention. In the present specification, the schematic representation of the above terms does not necessarily mean the same embodiment or example. Furthermore, the particular features, structures, materials, or features described may be combined in a suitable manner in any one or more embodiments or examples. In addition, various embodiments or examples described in the specification, as well as features of various embodiments or examples, may be combined and combined by those skilled in the art without contradicting each other.

Although this disclosure is disclosed as above, the scope of protection of this disclosure is not limited to this. Those skilled in the art can make various changes and modifications without departing from the spirit and scope of the disclosure, and these changes and modifications will fall within the protection scope of the invention.

What is claimed is:

1. A cross button, comprising:
a button cap, a silicone pad, a circuit board and a controller, the circuit board being communicatively connected to the controller, the silicone pad being located between the button cap and the circuit board;
wherein a first anti-mistouch pillar and four first trigger pillars are disposed on the silicone pad, and both the first anti-mistouch pillar and the first trigger pillars are located on a side on the silicone pad close to the circuit board; the four first trigger pillars are evenly distributed on the silicone pad, and the first anti-mistouch pillar is located at a center of the four first trigger pillars; and
when all of the four first trigger pillars trigger signals, the controller controls a virtual button to trigger;
wherein the first anti-mistouch pillar has a stepped structure;
wherein the first anti-mistouch pillar comprises a first pillar section and a second pillar section that are connected to each other, the second pillar section is connected to the silicone pad, the first pillar section is located at a side of the second pillar section close to the circuit board, and a cross-sectional area of the first pillar section is smaller than a cross-sectional area of the second pillar section; and a height of the second pillar section is smaller than a height of the first trigger pillar.

2. The cross button according to claim 1, wherein a height of the first anti-mistouch pillar is greater than or equal to a height of the first trigger pillar.

3. The cross button according to claim 1, wherein a second anti-mistouch pillar is disposed on the button cap, and the second anti-mistouch pillar is located on a side of the button cap close to the silicone pad and corresponds to a position of the first anti-mistouch pillar.

4. The cross button according to claim 3, wherein the button cap is further provided with four second trigger pillars, the four second trigger pillars are located on a side of the button cap close to the silicone pad, and positions of the four second trigger pillars respectively correspond to positions of the four first trigger pillars.

5. The cross button according to claim 4, wherein a height of the second trigger pillar is equal to a height of the second anti-mistouch pillar.

6. The cross button according to claim 4, wherein a second limit groove matching with the second trigger pillar is further disposed on the silicone pad, the second limit groove is located at a side of the silicone pad close to the button cap, and the second limit groove is plugged and mated with the second trigger pillar.

7. The cross button according to claim 3, wherein the silicone pad is further provided with a first limit groove matching with the second anti-mistouch pillar, the first limit groove is located at a side of the silicone pad close to the button cap, and the first limit groove is plugged and mated with the second anti-mistouch pillar.

8. A game controller with Dpad, comprising:
a cross button, comprising:
a button cap, a silicone pad, a circuit board and a controller, the circuit board being communicatively connected to the controller, the silicone pad being located between the button cap and the circuit board;
wherein a first anti-mistouch pillar and four first trigger pillars are disposed on the silicone pad, and both the first anti-mistouch pillar and the first trigger pillars are located on a side on the silicone pad close to the circuit board; the four first trigger pillars are evenly distributed on the silicone pad, and the first anti-mistouch pillar is located at a center of the four first trigger pillars; and
when all of the four first trigger pillars trigger signals, the controller controls a virtual button to trigger;
wherein the first anti-mistouch pillar has a stepped structure;
wherein the first anti-mistouch pillar comprises a first pillar section and a second pillar section that are connected to each other, the second pillar section is connected to the silicone pad, the first pillar section is located at a side of the second pillar section close to the circuit board, and a cross-sectional area of the first pillar section is smaller than a cross-sectional area of the second pillar section; and a height of the second pillar section is smaller than a height of the first trigger pillar.

9. The game controller with Dpad according to claim 8, wherein a height of the first anti-mistouch pillar is greater than or equal to a height of the first trigger pillar.

10. The game controller with Dpad according to claim 8, wherein a second anti-mistouch pillar is disposed on the button cap, and the second anti-mistouch pillar is located on a side of the button cap close to the silicone pad and corresponds to a position of the first anti-mistouch pillar.

11. The game controller with Dpad according to claim 10, wherein the button cap is further provided with four second trigger pillars, the four second trigger pillars are located on a side of the button cap close to the silicone pad, and positions of the four second trigger pillars respectively correspond to positions of the four first trigger pillars.

12. The game controller with Dpad according to claim 11, wherein a height of the second trigger pillar is equal to a height of the second anti-mistouch pillar.

13. The game controller with Dpad according to claim 11, wherein a second limit groove matching with the second trigger pillar is further disposed on the silicone pad, the second limit groove is located at a side of the silicone pad close to the button cap, and the second limit groove is plugged and mated with the second trigger pillar.

14. The game controller with Dpad according to claim 10, wherein the silicone pad is further provided with a first limit groove matching with the second anti-mistouch pillar, the first limit groove is located at a side of the silicone pad close to the button cap, and the first limit groove is plugged and mated with the second anti-mistouch pillar.

* * * * *